(12) United States Patent
Yao

(10) Patent No.: US 12,710,684 B2
(45) Date of Patent: Aug. 18, 2026

(54) LENS MOUNT REPLACEMENT DEVICE

(71) Applicant: Shenzhen Dongzheng Optical Technology Co., Ltd., Shenzhen (CN)

(72) Inventor: Songjian Yao, Shenzhen (CN)

(73) Assignee: Shenzhen Dongzheng Optical Technology Co., Ltd., Shenzhen (CN)

( * ) Notice: Subject to any disclaimer, the term of this patent is extended or adjusted under 35 U.S.C. 154(b) by 225 days.

(21) Appl. No.: 18/713,333

(22) PCT Filed: Jan. 24, 2022

(86) PCT No.: PCT/CN2022/073578
§ 371 (c)(1),
(2) Date: Oct. 7, 2024

(87) PCT Pub. No.: WO2023/103164
PCT Pub. Date: Jun. 15, 2023

(65) Prior Publication Data
US 2025/0328061 A1 Oct. 23, 2025

(30) Foreign Application Priority Data
Dec. 8, 2021 (CN) ........................ 202111493393.0

(51) Int. Cl.
*G03B 17/14* (2021.01)
*G02B 7/02* (2021.01)

(52) U.S. Cl.
CPC ............ *G03B 17/14* (2013.01); *G02B 7/026* (2013.01)

(58) Field of Classification Search
CPC .... G03B 17/14; G03B 17/565; G03B 17/566; G02B 7/026
See application file for complete search history.

(56) References Cited

U.S. PATENT DOCUMENTS 9,261,756 B2 * 2/2016 Kuroiwa .............. G03B 17/565
2005/0025472 A1 2/2005 Sugita et al.
(Continued)

FOREIGN PATENT DOCUMENTS

CN 107065118 A 8/2017
CN 107656409 A 2/2018
(Continued)

OTHER PUBLICATIONS

International Search Report for Application No. PCT/CN2022/073578 dated Aug. 12, 2022, 3 pages.
(Continued)

*Primary Examiner* — Kelly L Jerabek
(74) *Attorney, Agent, or Firm* — TraskBritt

(57) ABSTRACT

A lens mount replacement device. A first notch and a second notch communicated with each other are formed in a base, an ejector pin is provided in the first notch, a button is provided in the second notch, the ejector pin can move under the action of the button, a first slot is formed in the base, a first reverse slot of a sliding pressing ring is formed in the first slot in a penetrating mode, a mount rotating ring and a rotating ring pressing ring are clamped on the base, and a hand screwing ring is sleeved on the first reverse slot of the sliding pressing ring from the distal end and is fixed in a threaded connection mode. The mount is inserted into the sliding pressing ring and locked by rotating the hand screwing ring.

7 Claims, 5 Drawing Sheets

(56) References Cited

U.S. PATENT DOCUMENTS

| | | | | |
|---|---|---|---|---|
| 2011/0013902 | A1 * | 1/2011 | Kim | G03B 17/14 396/530 |
| 2016/0041453 | A1 * | 2/2016 | Pizzo | G03B 17/14 396/530 |
| 2018/0039042 | A1 * | 2/2018 | Suzuki | G02B 7/04 |
| 2019/0273849 | A1 * | 9/2019 | Schottner | G02B 7/026 |
| 2020/0249550 | A1 | 8/2020 | Yano et al. | |

FOREIGN PATENT DOCUMENTS

| | | |
|---|---|---|
| CN | 213028253 | 4/2021 |
| CN | 213750628 | 7/2021 |
| CN | 216526684 | 5/2022 |
| JP | 2017-138437 A | 8/2017 |
| JP | 2020-012881 A | 1/2020 |

OTHER PUBLICATIONS

International Written Opinion for Application No. PCT/CN2022/073578 dated Aug. 12, 2022, 8 pages.

European Extended Search Report and Opinion for European Application No. 22902609.1, dated Mar. 23, 2026, 8 pages.

* cited by examiner

LENS MOUNT REPLACEMENT DEVICE

CROSS REFERENCE TO RELATED APPLICATIONS

This application is a national phase entry under 35 U.S.C. § 371 of International Patent Application PCT/CN2022/073578, filed Jan. 24, 2022, designating the United States of America and published as International Patent Publication WO 2023/103164 A1 on Jun. 15, 2023, which claims the benefit under Article 8 of the Patent Cooperation Treaty to Chinese Patent Application Serial No. 202111493393.0, filed Dec. 8, 2021.

TECHNICAL FIELD

The present disclosure relates to the technical field of photographic equipment, in particular, to a lens mount replacement device.

BACKGROUND

During actual shooting work, it is common to detach and replace a lens mount. For example, to acquire a more accurate focusing scale or a more ideal parfocal effect, the mount needs to be disassembled to adjust the flange focal distance of a lens; or, in a case where the lens is mounted on cameras with different mounts to experience and compare the shooting effects of different cameras, corresponding mounts need to be disassembled and replaced.

According to a conventional mount fixing method, the mount is locked on the lens through several screws. When the mount needs to be disassembled, the screws need to loosened and taken down with tools (such as a screwdriver) to disassemble the mount. Correspondingly, the screws need to lock the mount again when the mount is installed. Therefore, when adopting the conventional method, a user has to prepare tools with corresponding models in advance. The detaching process of the screws is time-consuming and boring. The screws taken down are easy to lose accidentally. During installation, the screws need to be fastened again. Moreover, if the locking force of the screws is uneven, the mount may be installed obliquely, thereby compromising the shooting effect of the lens.

BRIEF SUMMARY

To overcome defects in current lens mount replacement, the present disclosure provides a lens mount replacement device that is able to rapidly disassemble, replace and install a mount.

In order to achieve the above object, the present disclosure provides a lens mount replacement device, including:

- a base, wherein a first notch is provided in a proximal face of the base, and a second notch is provided in an outer diameter face of the base; the first notch and the second notch are communicated with each other; an ejector pin is provided in the first notch, a button is inserted into the second notch, and the ejector pin moves up and down under the action of the button; and a locating column, a first slot and a through hole are further provided in the proximal face of the base;
- a mount rotating ring, provided at a proximal end of the base, where a first limiting slot of the mount rotating ring corresponds to the ejector pin and a second limiting slot of the mount rotating ring corresponds to the locating column; and a first limiting screw hole is further provided in a proximal face of the mount rotating ring, and a first limiting screw column is provided in the first limiting screw hole;
- a rotating ring pressing ring, pressed against the proximal end of the mount rotating ring and fixed to the base;
- a sliding pressing ring, provided with a first reverse slot, where the first reverse slot is provided in a penetrating mode in the first slot of the base; and the sliding pressing ring is further provided with a second slot;
- a hand screwing ring, sleeved on the base from a distal end of the base and screwed into the first reverse slot of the sliding pressing ring; and
- a mount, comprising a third slot and a second reverse slot, where the second reverse slot is inserted into the second slot of the sliding pressing ring; and the third slot corresponds to the first limiting screw column of the mount rotating ring.

Preferably, the device further comprises:

- a corrugated spring gasket, cushioned between a lens and the base.

Preferably, a first screw hole and a second screw hole are provided in a proximal end of the lens, and a second limiting screw column is provided in the second screw hole; and

- the first screw hole is fixed to the through hole of the base through a screw.

More preferably, a lug boss is provided on an inner side of the hand screwing ring, and the lug boss corresponds to the second limiting screw column to limit the hand screwing ring.

Preferably, a hand screw is provided on an outer side face of the hand screwing ring.

Preferably, non-slip stripes are provided on the outer side face of the hand screwing ring.

Preferably, the device further comprises:

- a mount gasket, arranged between the mount rotating ring and the mount, where a fourth slot is provided in the mount gasket, and the fourth slot is connected to the first limiting screw column in a clamped mode.

The embodiments of the present disclosure provided a lens mount replacement device, the first notch and the second notch communicated with each other are formed in the base, the ejector pin is provided in the first notch, the button is provided in the second notch, the ejector pin can move under the action of the button, the first slot is formed in the base, the first reverse slot of a sliding pressing ring is formed in the first slot in a penetrating mode, the mount rotating ring and the rotating ring pressing ring are clamped on the base, and the hand screwing ring is sleeved on the first reverse slot of the sliding pressing ring from the distal end and is fixed in a threaded connection mode. The lens mount replacement device provided by the present disclosure can achieve rapid disassembly, replacement and installation of the mount, and the mount can be rapidly disassembled without a tool.

DETAILED DESCRIPTION

The technical solution of the present disclosure will be further described in detail by means of the accompanying drawings and the embodiments.

The embodiments of the present disclosure provided a lens mount replacement device, the first notch and the second notch communicated with each other are formed in the base, the ejector pin is provided in the first notch, the button is provided in the second notch, the ejector pin can move under the action of the button, the first slot is formed in the base, the first reverse slot of the sliding pressing ring is formed in the first slot in a penetrating mode, the mount rotating ring and the rotating ring pressing ring are clamped on the base, and the hand screwing ring is sleeved on the first reverse slot of the sliding pressing ring from the distal end and is fixed in a threaded connection mode. The lens mount replacement device provided by the present disclosure can achieve rapid disassembly, replacement and installation of the mount, and the mount can be rapidly disassembled without a tool.

As discussed in the present disclosure, the term "distal end" or "proximal end" is used for describing a position or direction herein, where the "distal end" is a direction or position away from the camera, and the "proximal end" is a direction or position close to the camera.

Figure 1:
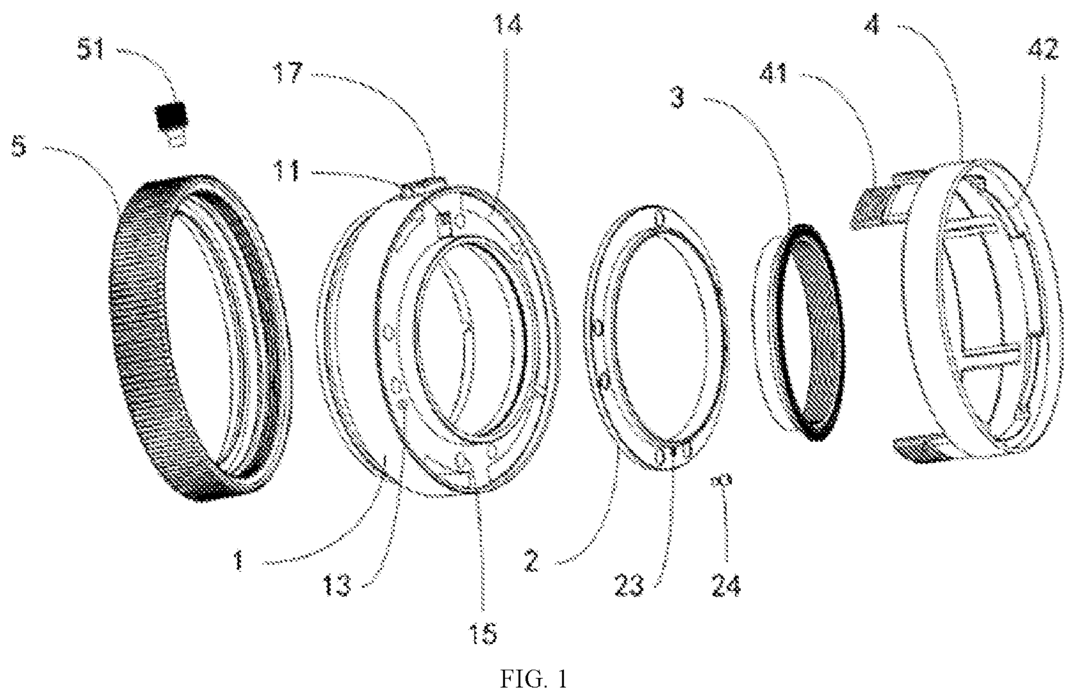
FIG. 1 is an exploded view of a lens mount replacement device provided by an embodiment of the present disclosure.
Figure 5:
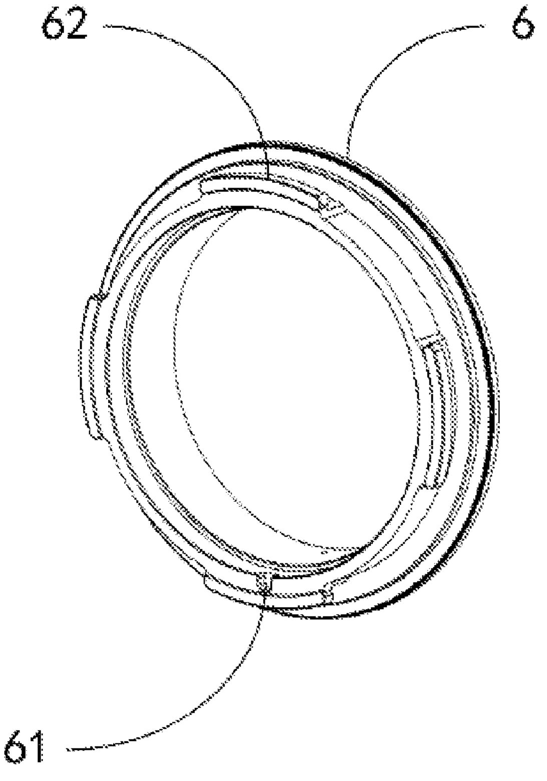
FIG. 5 is a view of a distal end of the mount provided by the embodiment of the present disclosure.

FIG. 1 is an exploded view of a lens mount replacement device provided by an embodiment of the present disclosure. FIG. 5 is a view of a distal end of the mount provided by the embodiment of the present disclosure. As shown in FIG. 1 and FIG. 5, the lens mount replacement device comprises a base 1, a mount rotating ring 2, a rotating ring pressing ring 3, a sliding pressing ring 4, a hand screwing ring 5 and a mount 6.

Figure 2A:
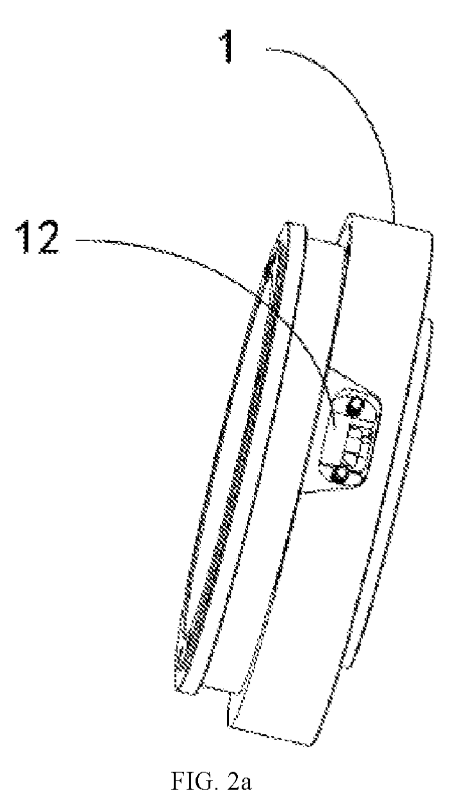
FIG. 2*a* is a side schematic diagram of a base provided by the embodiment of the present disclosure.
Figure 2B:
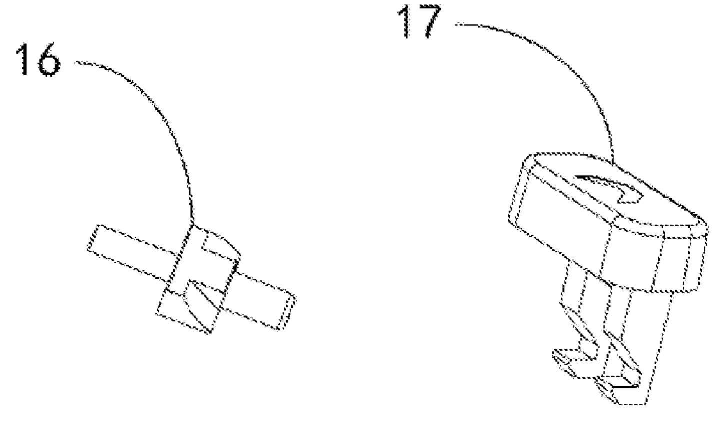
FIG. 2*b* is a structural schematic diagram of an ejector pin and a button provided by the embodiment of the present disclosure.

The first notch 11 is provided in the proximal face of the base 1, and the second notch 12 is provided in the outer diameter face of the base 1. As shown in FIG. 2*a*, the first notch 11 and the second notch 12 are communicated with each other, the ejector pin 16 is provided in the first notch 11, a spring is sleeved on the ejector pin 16, two fixed columns are provided in the second notch 12, a spring is sleeved on each of the two fixed columns, the button 17 is inserted into the second notch 12, and an inverted hook bevel is provided on the button 17. As shown in FIG. 2*b*, the inverted hook bevel of the button 17 clings to a bevel of the ejector pin 16. Then an ejector cover plate of the ejector pin 16 is locked to the base 1 through screws, so as to achieve the effect that the button 17 is pressed down to descend the ejector pin 16 and the button 17 is loosened to eject the ejector pin 16. Moreover, when ejected, the ejector pin 16 can trap an inverted hook location on the button 17 to achieve a self-locking effect of the button 17.

Figure 3:
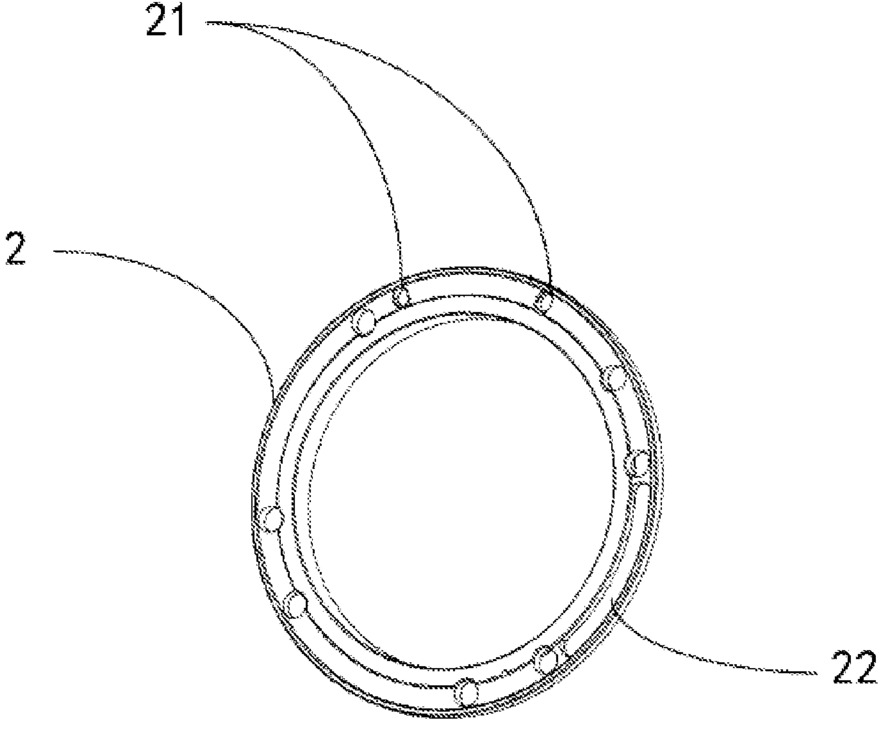
FIG. 3 is a view of a distal end of a mount rotating ring provided by the embodiment of the present disclosure.

The locating column 13 is further provided on the base 1, two first limiting slots 21 are provided in the mount rotating ring 2, and the second limiting slot 22 and the first limiting screw hole 23 are further provided, as shown in FIG. 3; one of the first limiting slots 21 is aligned with the ejector pin 16 in the first notch 11 and is placed on the base 1, and in this case, the locating column 13 just falls into the second limiting slot 22; the first limiting screw column 24 is locked into the first limiting screw hole 23, and then the rotating ring pressing ring 3 is locked to the base 1 from the proximal end of the mount rotating ring 2 to cover the mount rotating ring 2; and moreover, there is a gap between the rotating ring pressing ring 3 and the mount rotating ring 2, so that the mount rotating ring 2 will not fall off while rotating.

The first slot 14 is further provided in the base 1, the first reverse slot 41 is provided in the sliding pressing ring 4, the first reverse slot 41 of the sliding pressing ring 4 is inserted into the first slot 14 of the base 1 from the proximal direction, the first reverse slot 41 stretches out from the distal end of the first slot 14, and the outer diameter face of the first reverse slot 41 has external threads; the hand screwing ring 5 has internal threads, and the hand screwing ring 5 is sleeved on the first reverse slot 41 of the sliding pressing ring 4 from the distal end, so that the internal threads of the hand screwing ring 5 is screwed with the external threads of the first reverse slot 41 of the sliding pressing ring 4, and the axial movement of the sliding pressing ring 4 can be controlled by rotating the hand screwing ring 5; and the hand screw 51 is further provided on the outer diameter face of the hand screwing ring 5, so that the arm of force can be improved, and furthermore, the non-slip stripes are further provided on the outer diameter face of the hand screwing ring 5, so that the hand screwing ring 5 can be more conveniently fastened or loosened.

Figure 4:
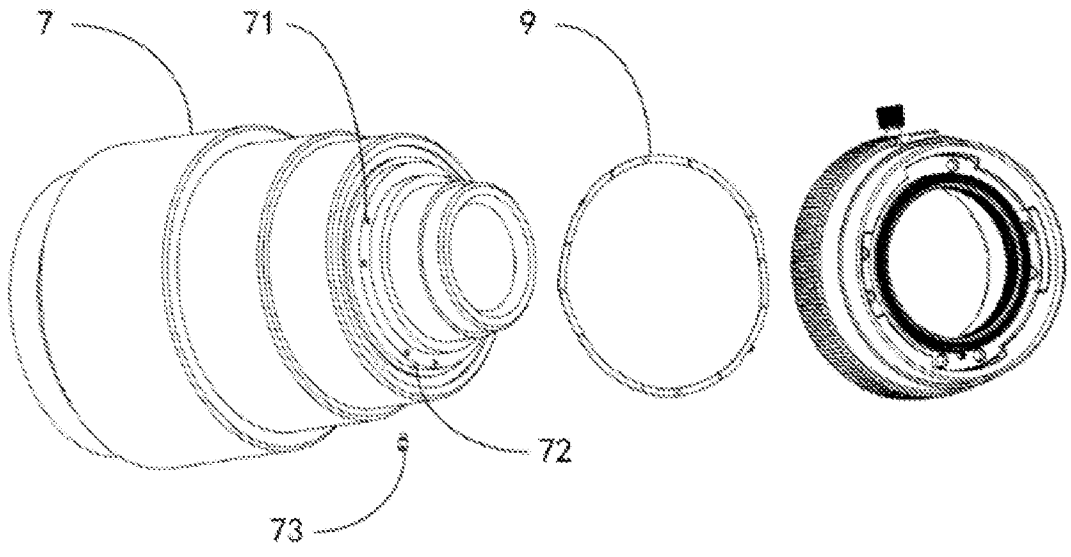
FIG. 4 is an installation schematic diagram of the lens mount replacement device and the lens provided by the embodiment of the present disclosure.

As shown in FIG. 4, a first screw hole 71 and a second screw hole 72 are provided at the proximal end of a lens 7, where the second screw hole 72 is formed radially, and a second limiting screw column 73 is provided in the second screw hole 72; a corrugated spring gasket 9 is attached to the proximal end of the lens 7, and then a locking assembly including the base 1, the mount rotating ring 2, the rotating ring pressing ring 3, the sliding pressing ring 4 and the hand screwing ring 5 is attached to the proximal end of the lens 7 to press the corrugated spring gasket 9; the base 1 is further provided with a through hole 15, the through hole 15 is aligned with the first screw hole 71 of the lens 7 and is fixed through screws; the hand screwing ring 5 is further provided with a lug boss (not shown), and when the hand screwing ring 5 is rotated at a certain angle, the lug boss will collide with the second limiting screw column 73 to achieve a rotation-stopping function. Moreover, the corrugated spring gasket 9 can push against the hand screwing ring 5 to rotate clinging to the base 1 all the time.

Figure 6:
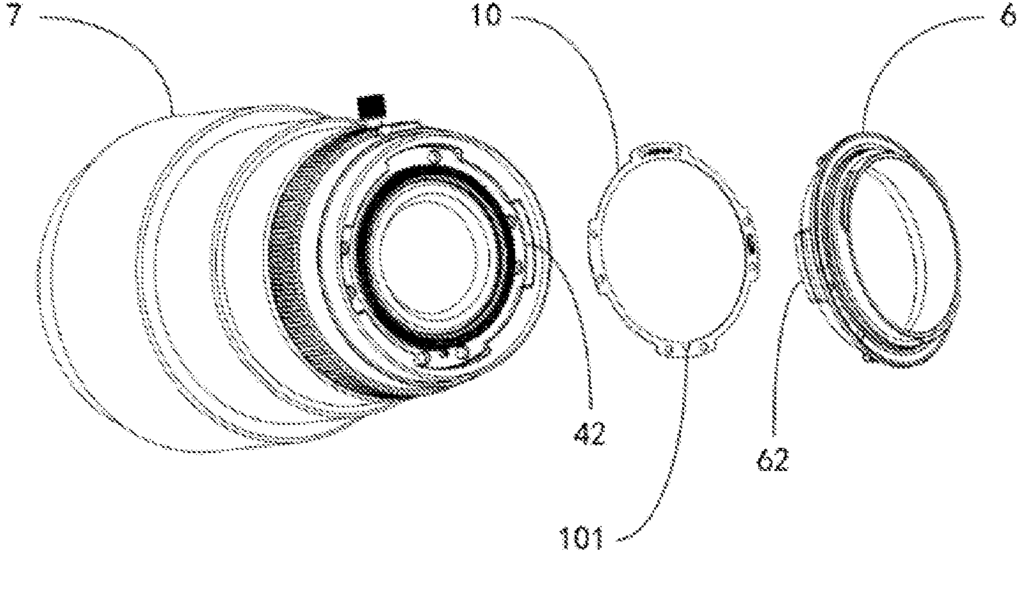
FIG. 6 is an installation schematic diagram of the mount provided by the embodiment of the present disclosure.

As shown in FIG. 6, when the mount 6 is installed, a mount gasket 10 is first placed at the proximal end of the locking assembly, a fourth slot 101 is provided in the mount gasket 10, and after the fourth slot 101 is aligned with the first limiting screw column 24, the mount gasket 10 is attached to a proximal end of the locking assembly; a second slot 42 is further provided in the sliding pressing ring 4, a third slot 61 and a second reverse slot 62 are provided in the mount 6, the second reverse slot 62 corresponds to the second slot 42 reversely, the third slot 61 is aligned with the first limiting screw column 24, the mount 6 is attached to the proximal end of the locking assembly, the button 17 is pressed, and the mount 6 is rotated. In the rotating process, the button 17 is loosened for further rotation till the ejector pin 16 is ejected, and then the hand screwing ring 5 is fastened to accomplish an installing operation of the mount 6.

Figure 7:
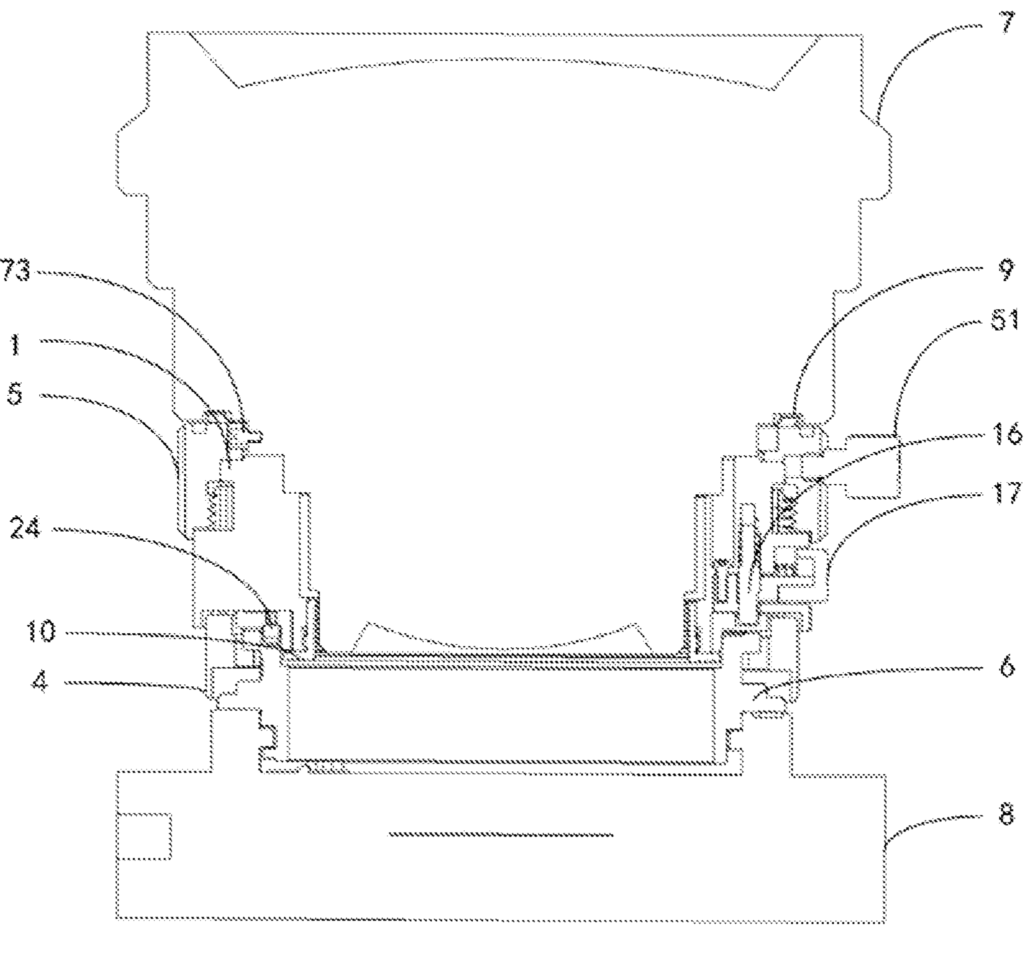
FIG. 7 is a structural schematic diagram of the lens mount replacement device, the lens and the camera provided by the embodiment of the present disclosure.

For the mounts of different cameras, it is only needed to provide the third slot 61 and the second reverse slot 62 with the same shape as the mount 6 provided by the present disclosure at the distal end of the mount, so that the lens mount replacement device provided by the embodiment of the present disclosure can be used. As shown in FIG. 7, the lens 7 is installed on the camera 8 through the lens mount replacement device.

A specific working process of the lens mount replacement device provided by the embodiment of the present disclosure is as follows:

During installation, the third slot 61 of the mount 6 is aligned with the first limiting screw column 24, the second reverse slot 62 is inserted into the second slot 42 of the sliding pressing ring 4, the button 17 is pressed, and the mount 6 is rotated at the same time. In the rotating process, the button 17 is loosened. When the mount 6 rotates in position, there will be a click feedback showing that the ejector pin 16 is ejected, and in this case, the mount 6 cannot rotate any more. Then the hand screwing ring 5 is rotated forcibly toward a locking direction to be locked.

During disassembly, the hand screwing ring 5 is rotated thoroughly (at about 90°) in a loosening direction, and then the button 17 is pressed, so that the ejector pin 16 descends, and in this case, the mount 6 is then rotated till it cannot rotate (at about 45°), so that the mount 6 can be taken out.

The embodiments of the present disclosure provided a lens mount replacement device, the first notch and the second notch communicated with each other are formed in the base, the ejector pin is provided in the first notch, the button is provided in the second notch, the ejector pin can move under the action of the button, the first slot is formed in the base, the first reverse slot of a sliding pressing ring is formed in the first slot in a penetrating mode, the mount rotating ring and the rotating ring pressing ring are clamped on the base, and the hand screwing ring is sleeved on the first reverse slot of the sliding pressing ring from the distal end and is fixed in a threaded connection mode. The lens mount replacement device provided by the present disclosure can achieve rapid disassembly, replacement and installation of the mount, and the mount can be rapidly disassembled without a tool.

With reference to the above-mentioned specific embodiments, the purposes, technical solutions and beneficial effects of the present invention are described in further detail. It should be understood that the above embodiments are merely the specific ones of the present disclosure and are not used to limit the scope of protection of the present disclosure. Any modifications, equivalent substitutions, improvements, etc., made based on the spirit and principle of the present disclosure should also fall within the protection scope of the present disclosure.

What is claimed is:

1. A lens mount replacement device, comprising:

a base, wherein a first notch is provided in a proximal face of the base, and a second notch is provided in an outer diameter face of the base; the first notch and the second notch are in communication with each other; an ejector pin is provided in the first notch, a button is inserted into the second notch, and the ejector pin is configured to move up and down under an action of the button; and a locating column, a first slot and through holes are further provided in the proximal face of the base;

a mount rotating ring, provided at a proximal end of the base, wherein a first limiting slot of the mount rotating ring corresponds to the ejector pin and a second limiting slot of the mount rotating ring corresponds to the locating column; and a first limiting screw hole is further provided in a proximal face of the mount rotating ring, and a first limiting screw column is provided in the first limiting screw hole;

a rotating ring pressing ring, pressed against the proximal end of the mount rotating ring and fixed to the base;

a sliding pressing ring, provided with a first reverse slot, wherein the first reverse slot is provided in a penetrating mode in the first slot of the base; and the sliding pressing ring is further provided with a second slot;

a hand screwing ring, sleeved on the base from a distal end of the base and screwed into the first reverse slot of the sliding pressing ring; and a mount, comprising a third slot and a second reverse slot, wherein the second reverse slot is inserted into the second slot of the sliding pressing ring; and the third slot corresponds to the first limiting screw column of the mount rotating ring.

2. The lens mount replacement device of claim 1, wherein the device further comprises:

a corrugated spring gasket, positioned between a lens and the base.

3. The lens mount replacement device of claim 1, wherein a first screw hole and a second screw hole are provided in a proximal end of the lens, and a second limiting screw column is provided in the second screw hole; and the first screw hole is fixed to the through hole of the base through a screw.

4. The lens mount replacement device of claim 3, wherein a lug boss is provided on an inner side of the hand screwing ring, and the lug boss corresponds to the second limiting screw column to limit the hand screwing ring.

5. The lens mount replacement device of claim 1, wherein a hand screw is provided on an outer side face of the hand screwing ring.

6. The lens mount replacement device of claim 1, wherein non-slip stripes are provided on an outer side face of the hand screwing ring.

7. The lens mount replacement device of claim 1, wherein the device further comprises:

a mount gasket, arranged between the mount rotating ring and the mount, wherein a fourth slot is provided in the mount gasket, the first limiting screw column is clamped in the fourth slot.

* * * * *